(12) United States Patent
Harada et al.

(10) Patent No.: US 11,356,883 B2
(45) Date of Patent: Jun. 7, 2022

(54) TERMINAL, RADIO COMMUNICATION METHOD, AND BASE STATION

(71) Applicant: NTT DOCOMO, INC., Tokyo (JP)

(72) Inventors: Hiroki Harada, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 18 days.

(21) Appl. No.: 17/043,332

(22) PCT Filed: Mar. 30, 2018

(86) PCT No.: PCT/JP2018/013849
§ 371 (c)(1),
(2) Date: Sep. 29, 2020

(87) PCT Pub. No.: WO2019/187092
PCT Pub. Date: Oct. 3, 2019

(65) Prior Publication Data
US 2021/0029572 A1    Jan. 28, 2021

(51) Int. Cl.
*H04W 24/10* (2009.01)
*H04W 56/00* (2009.01)

(52) U.S. Cl.
CPC ......... *H04W 24/10* (2013.01); *H04W 56/001* (2013.01)

(58) Field of Classification Search
None
See application file for complete search history.

(56) References Cited

U.S. PATENT DOCUMENTS

2018/0262313 A1*  9/2018  Nam .............. H04L 5/0044

FOREIGN PATENT DOCUMENTS

| WO | 2014/097732 A1 | 6/2014 | |
|---|---|---|---|
| WO | WO-2014171683 A1 * | 10/2014 | ........... H04L 5/1469 |
| WO | WO-2019066483 A1 * | 4/2019 | ........... H04W 16/14 |

OTHER PUBLICATIONS

3GPP TSG-RAN WG1 #89 R1-1707220, "Discussion on NR-SSS design with radio frame boundary indication", May 15-19, 2017 (Year: 2017).*
International Search Report issued in Application No. PCT/JP2018/013849, dated Jun. 19, 2018 (3 pages).
Written Opinion issued in International Application No. PCT/JP2018/013849, dated Jun. 19, 2018 (3 pages).

(Continued)

*Primary Examiner* — Scott M Sciacca
(74) *Attorney, Agent, or Firm* — Osha Bergman Watanabe & Burton LLP

(57) ABSTRACT

A terminal is disclosed including a receiver that receives a measurement instruction that indicates an inter-frequency measurement in a second carrier that is different from a first carrier of a serving cell; and a processor that assumes that frame boundaries of a plurality of cells on the second carrier are aligned, when information indicating whether an index of a synchronization signal block (SSB) transmitted by a neighboring cell can be derived based on a timing of the serving cell or a cell of a target frequency is included in the measurement instruction. In other aspects, a radio communication method of a terminal and a base station are also disclosed.

4 Claims, 7 Drawing Sheets

(56) References Cited

OTHER PUBLICATIONS

3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).
3GPP TSG RAN WG1 Meeting #88bis; R1-1705708; "Discussion and evaluation on NR-PBCH design;" NTT Docomo, Inc.; Apr. 3-7, 2017; Spokane, USA (8 pages).
3GPP TSG RAN WG1 Meeting #89; R1-1708444; "Discussion and evaluation on NR RRM measurement based on SS block;" NTT Docomo, Inc.; May 15-19, 2017; Hangzhou, P.R. China (9 pages).
3GPP TSG-RAN WG2 Meeting #100; R2-1712766 "Remaining issues for measurement object" vivo; Reno, USA Nov. 27-Dec. 1, 2017 (3 pages).
3GPP TSG-RAN WG1 Meeting #91; R1-1719549 "Discussion on Measurement for Mobility Management" MediaTek Inc.; Reno, USA; Nov. 27-Dec. 1, 2017 (11 pages).
3GPP TSG-RAN WG1 Meeting NR Ad-hoc #3; R1-1716282 "RRM Measurements for NR" Intel Corporation; Nagoya, Japan; Sep. 18-21, 2017 (13 pages).
Extended European Search Report issued in European Application No. 18912837.4, dated Nov. 22, 2021 (10 pages).

\* cited by examiner

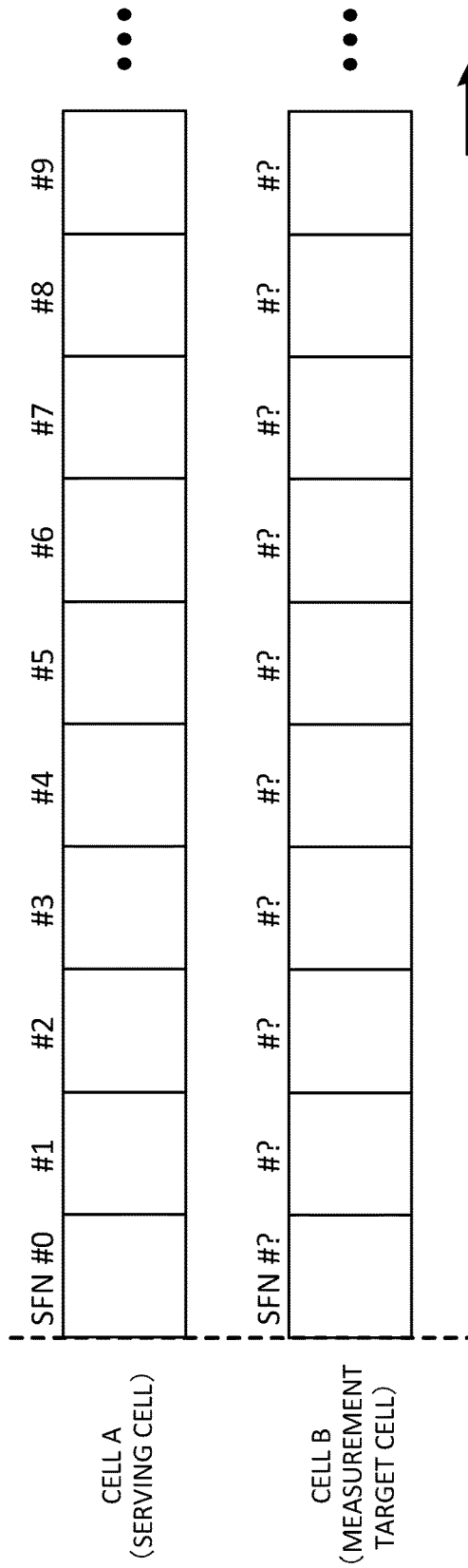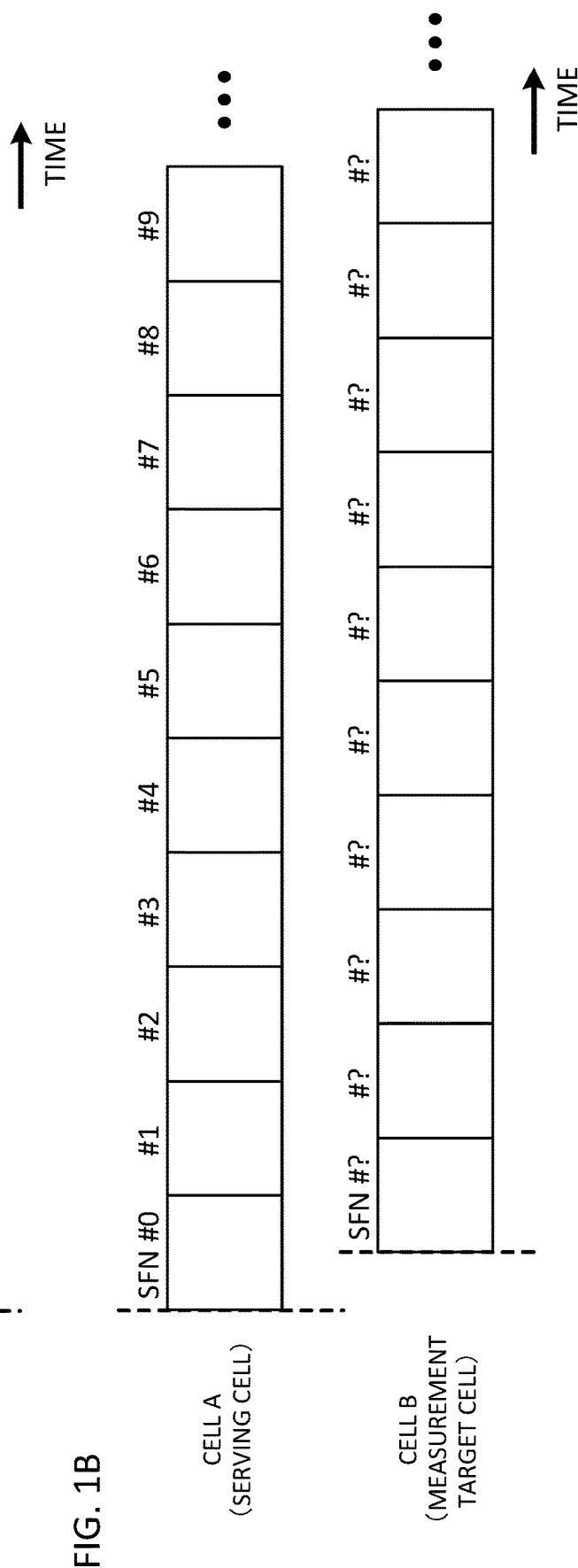

TERMINAL, RADIO COMMUNICATION METHOD, AND BASE STATION

TECHNICAL FIELD

The present disclosure relates to a user terminal and a radio base station of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for a larger capacity and higher sophistication than those of LTE (LTE Rel. 8 and 9), LTE-Advanced (LTE-A or LTE Rel. 10, 11, 12 and 13) has been specified.

LTE successor systems (also referred to as, for example, Future Radio Access (FRA), the 5th generation mobile communication system (5G), 5G+ (plus), New Radio (NR), New radio access (NX), Future generation radio access (FX) or LTE Rel. 14, 15 or subsequent releases) have been also studied.

In legacy LTE systems (e.g., LTE Rel. 8 to 13), a user terminal (UE: User Equipment) detects a Synchronization Signal (SS), synchronizes with a network (e.g., a base station (eNB: eNode B)), and identifies a cell (i.e., identifies a cell based on, for example, a cell Identifier (ID)) to connect with. This processing is also referred to as cell search. The synchronization signal includes, for example, a Primary Synchronization Signal (PSS) and/or a Secondary Synchronization Signal (SSS).

Furthermore, the UE receives broadcast information (e.g., a Master Information Block (MIB) or a System Information Block (SIB)), and obtains configuration information (that may be referred to as system information) for communicating with a network.

The MIB may be transmitted on a broadcast channel (PBCH: Physical Broadcast Channel). The SIB may be transmitted on a Downlink (DL) shared channel (PDSCH: Physical Downlink Shared Channel).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

A future radio communication system (also referred to simply as NR below) uses measurement that uses a Synchronization Signal Block (SSB). An SSB-based Measurement Timing Configuration (SMTC) is notified to the UE. The UE performs measurement based on a measurement target SSB in a configured SMTC window.

Furthermore, NR supports inter-frequency measurement for performing measurement in a cell different from a connected serving cell. During the measurement, the UE needs to recognize a frame timing of the cell. The UE can decide the frame timing based on an SSB index. To grasp the SSB index, it is necessary to perform decoding processing on a PBCH included in the SSB, and/or detection processing on a sequence pattern of a PBCH DeModulation Reference Signal (DMRS).

However, if the UE needs to perform the above processing on the PBCH in the measurement target cell at all times during inter-frequency measurement, there is a problem that measurement delay increases and a communication throughput lowers.

It is therefore one of objects of the present disclosure to provide a user terminal and a radio base station that can suppress a decrease of a communication throughput even when inter-frequency measurement is performed.

Solution to Problem

A user terminal according to one aspect of the present disclosure includes: a measurement section that, when a first carrier includes a serving cell, performs inter-frequency measurement in a second carrier based on a measurement instruction; and a control section that, when specific information is included in the measurement instruction, controls processing related to a Synchronization Signal Block (SSB) in a measurement target cell based on the specific information.

Advantageous Effects of Invention

According to one aspect of the present disclosure, it is possible to suppress a decrease of a communication throughput even when inter-frequency measurement is performed.

BRIEF DESCRIPTION OF DRAWINGS

FIGS. 1A and 1B are diagrams illustrating one example of an assumption of a frame timing according to one embodiment.

DESCRIPTION OF EMBODIMENTS

Figure 2:
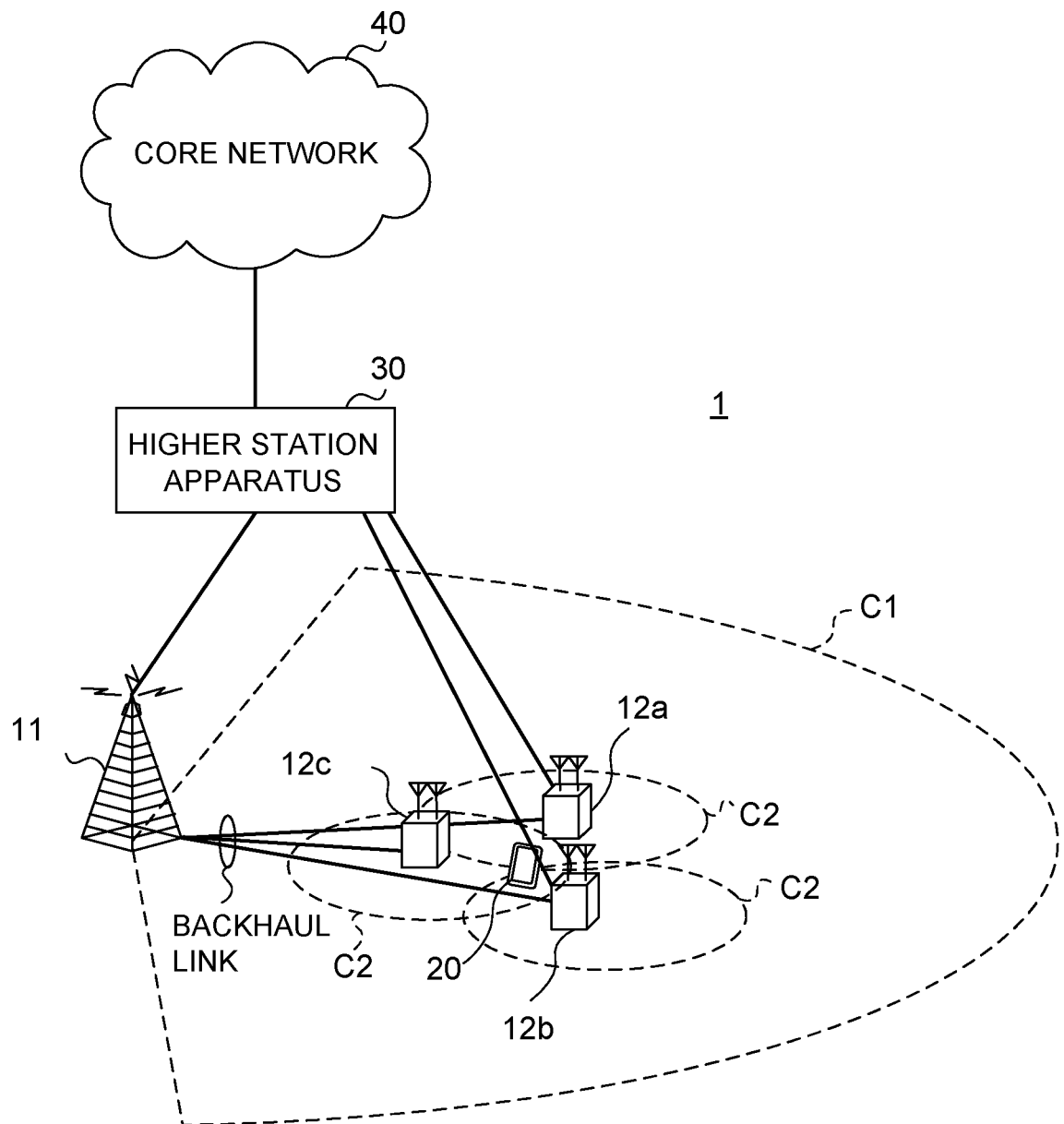
FIG. 2 is a diagram illustrating one example of a schematic configuration of a radio communication system according to the one embodiment.

In a legacy LTE system, a UE supports inter-frequency measurement for performing measurement in a non-serving carrier different from a connected serving carrier.

The UE switches (retunes) a use frequency (RF: Radio Frequency) from the serving carrier to the non-serving carrier in a Measurement Gap (MG), performs measurement by using a reference signal, and then switches the use frequency from the non-serving carrier to the serving carrier.

In this regard, the MG is a duration for performing inter-frequency measurement, and the UE stops transmission and reception in a communicating carrier in this duration, and performs measurement in a carrier of another frequency.

According to LTE, while an inter-frequency carrier is measured by using the MG, the RF is switched, and therefore transmission and reception cannot be performed in the serving cell. On the other hand, there is no restriction on transmission and reception relative to measurement in other cases (e.g., intra-frequency measurement).

According to NR, the following measurement has been studied.
(1) Intra-frequency measurement without an MG,
(2) Intra-frequency measurement with an MG, and
(3) Inter-frequency measurement.

The above (1) intra-frequency measurement without the MG will be also referred to as a same frequency measurement without RF retuning. The above (2) intra-frequency measurement with the MG will be also referred to as a same frequency measurement with RF retuning. When, for example, a measurement target signal is not included in a band of an active BandWidth Part (BWP), intra-frequency measurement also requires RF retuning, and therefore the above (2) measurement is performed.

In this regard, the BWP corresponds to one or more partial frequency bands in a Component Carrier (CC) configured by NR. The BWP may be referred to as a part frequency band or a part band.

The above (3) inter-frequency measurement will be also referred to as a different frequency measurement. The inter-frequency measurement assumes use of the MG. However, when the UE reports UE capability of gap less measurement to a base station (that may be referred to as, for example, a Base Station (BS), a Transmission/Reception Point (TRP), an eNodeB (eNB) or a gNB (NR NodeB)), it is possible to perform inter-frequency measurement without the MG.

According to NR, while an intra-frequency carrier or an inter-frequency carrier is measured by using the MG, the RF is switched, and therefore transmission and reception cannot be performed in the serving cell.

According to LTE and NR, intra-frequency measurement and/or inter-frequency measurement may measure at least one of Reference Signal Received Power (RSRP) of the non-serving carrier, a Received Signal Strength Indicator (RSSI), Reference Signal Received Quality (RSRQ) and a Signal to Interference plus Noise Ratio (SINR).

In this regard, the RSRP is received power of a desired signal and is measured by using, for example, at least one of a Cell-specific Reference Signal (CRS) and a Channel State Information-Reference Signal (CSI-RS). The RSSI is total received power including received power of a desired signal, and interference plus noise power. The RSRQ is a ratio of the RSRP with respect to the RSSI.

The desired signal may be a signal including a Synchronization Signal Block (SSB). The SSB is a signal block including a Synchronization Signal (SS) and a broadcast channel (also referred to as a broadcast signal, a PBCH or an NR-PBCH), and may be referred to as an SS/PBCH block.

The SS included in the SSB may include a Primary Synchronization Signal (PSS) or a Secondary Synchronization Signal (SSS). The SSB includes one or more symbols (e.g., OFDM symbols). In the SSB, the PSS, the SSS and the PBCH may be each arranged on 1 or more different symbols. For example, the SSB may include 4 or 5 symbols in total including 1 symbol for the PSS, 1 symbol for the SSS and 2 or 3 symbols for the PBCH.

In addition, measurement performed by using the SS (or the SSB) may be referred to as SS (or SSB) measurement. As the SS (or SSB) measurement, for example, SS-RSRP, SS-RSRQ or SS-SINR measurement may be performed. The PSS, the SSS and DeModulation Reference Signal (DMRS) corresponding to the PBCH, and so on may be used for the SS (or SSB) measurement.

The UE may perform communication (transmission and reception, and measurement of a signal) by using at least one frequency range (carrier frequency) of a first frequency range (FR 1: Frequency Range 1) and a second frequency range (FR 2: Frequency Range 2).

For example, the FR 1 may be a frequency range equal to or less than 6 GHz (sub-6 GHz), and the FR 2 may be a frequency range higher than 24 GHz (above-24 GHz). The FR 1 may be defined as a frequency range that uses at least one of 15, 30 and 60 kHz as a Sub-Carrier Spacing (SCS), and the FR 2 may be defined as a frequency range that uses at least one of 60 and 120 kHz as the SCS. In addition, the frequency ranges and the definitions of the FR 1 and the FR 2 are not limited to these, and, for example, the FR 1 may be a frequency range higher than that of the FR 2.

The FR 2 may be used only for a Time Division Duplex (TDD) band. The FR 2 is preferably synchronously operated between a plurality of base stations. When the FR 2 includes a plurality of carriers, these carriers are preferably synchronously operated.

Information (e.g., "MeasObjectNR" information element) related to intra-frequency measurement and/or inter-frequency measurement may be notified (configured) to the UE from the base station by using, for example, higher layer signaling, physical layer signaling or a combination of these.

In this regard, the higher layer signaling may be, for example, one or a combination of Radio Resource Control (RRC) signaling, Medium Access Control (MAC) signaling and broadcast information.

The MAC signaling may use, for example, an MAC Control Element (MAC CE) or an MAC Protocol Data Unit (MAC PDU). The broadcast information may be, for example, a Master Information Block (MIB), a System Information Block (SIB) and Remaining Minimum System Information (RMSI).

The information related to intra-frequency measurement and/or inter-frequency measurement may include information that is applicable to the intra-frequency measurement and the inter-frequency measurement that uses the SSB and/or the CSI-RS. The information related to the intra-frequency measurement and/or the inter-frequency measurement may include, for example, a measurement target frequency range (carrier), whether or not the measurement target carrier is synchronized, a resource position (a slot number, a symbol number or an RB index) of a measurement target signal (such as a DMRS or a CSI-RS), an SSB-based Measurement Timing Configuration (SMTC), and a measurement target SSB index. The SSB index may be associated with an SSB resource position.

In addition, whether or not the measurement target carrier is synchronized may be configured to the UE by RRC signaling by using information (that may be referred to as a parameter "useServingCellTimingForSync") related to whether or not the measurement target carrier is synchronized with the serving cell (whether or not an index of the SSB to be transmitted by a neighbour cell (or a surrounding cell) can be derived based on a timing of the serving cell). The information may be referred to as information related to deriving of the SSB index or information related to carrier (or cell) synchronization.

When the information (e.g., "MeasObjectNR" information element) related to intra-frequency measurement and/or inter-frequency measurement includes useServingCellTimingForSync, useServingCellTimingForSync may be assumed to be enabled. When the information does not include useServingCellTimingForSync, useServingCellTimingForSync may be assumed to be disabled.

A position of a measurement target SSB in an SMTC duration may be notified by a bitmap (that may be referred to as a parameter "ssb-ToMeasure"). The bitmap may be associated with a measurement target frequency range. When, for example, the measurement target frequency range is a higher frequency range, a longer bitmap may be used to notify the SSB index.

The SMTC may include a length, a periodicity and a timing offset of an SSB measurement duration (that may be referred to as an SMTC window or a measurement timing). The UE performs measurement based on the measurement target SSB in the configured SMTC window.

UE capability signaling for configuring an inter-frequency measurement MG may be supported. As the UE capability signaling, for example, the inter-frequency measurement MG of each of the FR 1 and the FR 2 can be individually configured.

For example, the UE may notify capability signaling including an MG length or duration and an MG repetition periodicity for a gap corresponding to at least one of an FR 1-specific gap, an FR 2-specific gap and a UE-specific gap.

<Relationship Between SSB and Synchronization>

By the way, similar to LTE, NR can perform only an inter-cell synchronous operation and an inter-cell asynchronous operation on an identical frequency, but also an inter-frequency carrier synchronous operation and asynchronous operation (a synchronous operation and an asynchronous operation of different frequency carriers). In this regard, "synchronization" has two viewpoints that radio frame boundaries (or frame timings) of a plurality of carriers (or a plurality of cells) are aligned and System Frame Numbers (SFNs) of the plurality of carriers are aligned.

The UE may grasp the SFN by decoding (reading) a PBCH included in an SSB. For example, the PBCH according to NR may include information indicating a 10-bit SFN.

The UE may decide a frame timing of a target cell (or carrier) based on an SSB index and a Half Frame Index (HFI). Furthermore, the UE may decide the frame timing of the target cell (or carrier) based on the SSB index.

The UE may detect the SSB index from a PBCH DMRS sequence pattern in the FR 1. The UE may determine information of lower 3 bits of the SSB index from the PBCH DMRS sequence pattern in the FR 2, and obtain information of the rest of upper 3 bits from a PBCH payload.

The UE may detect the HFI from the PBCH DMRS sequence pattern in a carrier (that may be referred to as a band) equal to or less than 3 GHz. The UE may obtain the HFI from the PBCH payload in a carrier equal to or more than 3 GHz.

During inter-cell synchronization and/or inter-carrier synchronization, the UE may derive at what timing a specific signal of an observation (measurement) target cell is received, from a frame timing of the connected serving cell (or a frame timing of another cell of the carrier of the same frequency). In this case, it is possible to simplify a signal detection operation of the UE.

When, for example, useServingCellTimingForSync is enabled in information related to intra-frequency measurement (e.g., MeasObjectNR including the information related to intra-frequency measurement), the UE can derive an SSB index of a detected surrounding (neighbour) cell based on a frame timing of the serving cell of this frequency, and therefore may not read contents (information of the SSB index) of the PBCH of the surrounding cell or detect a PBCH DMRS sequence pattern.

On the other hand, in a case of inter-frequency measurement, there is not the "serving cell" at the different frequency during measurement. Therefore, it is not possible to derive an SSB index of a neighbour cell based on a frame timing of the serving cell of the same frequency.

However, when the SSB index needs to be reported during inter-frequency measurement, if the UE needs to decode the PBCH without fail in at least one cell or detect the PBCH DMRS sequence pattern without fail, there is a problem that measurement delay increases and a communication throughput lowers. Handover also has the same problem.

The inventors of this application have conceived a UE operation for suppressing a decrease of a communication throughput even when inter-frequency measurement is performed.

An embodiment according to the present disclosure will be described in detail below with reference to the drawings. A radio communication method according to each embodiment may be each applied alone or may be applied in combination.

(Radio Communication Method)

According to one embodiment, useServingCellTimingForSync may be used as information related to whether or not deriving of an SSB index can be simplified (whether or not the SSB index can be derived by using a frame timing of a connected serving cell) during inter-frequency measurement.

When, for example, useServingCellTimingForSync is enabled (included) in an inter-frequency measurement instruction (the "MeasObjectNR" information element related to inter-frequency measurement), the UE may assume that a carrier of a measurement target frequency and at least one serving cell are synchronized. When useServingCellTimingForSync is enabled in the inter-frequency measurement instruction, the UE may derive the SSB index of a cell of the measurement target frequency by using a frame timing of a connected serving cell.

That is, when the carrier at the different frequency and the connected serving cell are synchronized even during inter-frequency measurement, the UE may simplify deriving of the SSB index by using a given timing (e.g., frame timing) of the connected serving cell.

In this regard, the connected serving cell may be a Primary Cell (PCell) when a node that notifies the UE of the above inter-frequency measurement instruction is a Master Node (MN), or may be a Primary Secondary Cell (PSCell) when the node is a Secondary Node (SN). In addition, the connected serving cell may be another Secondary Cell (SCell) or a PUCCH-SCell.

When useServingCellTimingForSync is enabled in the inter-frequency measurement instruction configured by the MN, a frame timing of the serving PCell may be used to derive an index of the SSB to be transmitted from a measurement target cell (neighbour cell).

When useServingCellTimingForSync is enabled in the inter-frequency measurement instruction configured by the SN, the frame timing of the serving PSCell may be used to derive the index of the SSB to be transmitted from the measurement target cell (neighbour cell).

In addition, the MN may represent a base station that the UE that uses, for example, dual connectivity establishes RRC connection with. The SN may represent a base station that provides a radio resource in addition of a radio resource of the MN to the UE that uses, for example, dual connectivity.

FIGS. 1A and 1B are diagrams illustrating one example of an assumption of a frame timing according to one embodiment. FIG. 1A illustrates an assumption in a case where useServingCellTimingForSync is enabled in the inter-frequency measurement instruction. In a case of FIG. 1A, the UE may assume that frame timings of a serving cell (cell A) and a cell B (inter-frequency measurement target cell) of another carrier are synchronized. In addition, the UE may assume that an SFN of the cell B is unknown, or may assume that the SFN of the cell B can be determined based on an SFN of the cell A (e.g., the SFN of the cell B is the same as the SFN of the cell A).

FIG. 1B illustrates an assumption in a case where useServingCellTimingForSync is not enabled (included) in the inter-frequency measurement instruction. In a case of FIG. 1B, the UE does not assume (or cannot assume or should not assume) that the frame timings of the serving cell (cell A) and the cell B (inter-frequency measurement target cell) of another carrier are synchronized.

The UE may assume that, when useServingCellTimingForSync is enabled in the inter-frequency measurement instruction, frame timings are synchronized across cells on the measurement target frequency. In this case, the UE may not assume synchronization between the carriers (e.g., between the carrier of a connected serving cell and a measurement target frequency carrier). Furthermore, in this case, if the UE grasps a half frame timing (or a frame timing) to obtain an SSB index of at least one cell of the measurement target frequency, the UE can determine an SSB index of another cell based on the SSB index of the one cell and/or the half frame timing.

According to the one embodiment, useServingCellTimingForSync may be used as information related to whether or not to decode a PBCH during inter-frequency measurement.

For example, when useServingCellTimingForSync is enabled in the inter-frequency measurement instruction, the UE may not decode the PBCH in a cell of the measurement target frequency. In addition, decoding may be read as reception or detection. Not decoding the PBCH may mean ignoring the PBCH.

According to the one embodiment, useServingCellTimingForSync may be used as information related to whether or not SFNs are synchronized (aligned) during inter-frequency measurement.

For example, when useServingCellTimingForSync is enabled in the inter-frequency measurement instruction, the UE may decide that the SFN of the connected serving cell and the SFN of the measurement target carrier (and/or cell) are synchronized (aligned).

According to the above-described one embodiment, it is possible to omit decoding of a PBCH of a measurement target cell during inter-frequency measurement, and consequently suppress a decrease of a communication throughput.

<Modified Example>

According to the above embodiment, a UE has decided an assumption of synchronization based on useServingCellTimingForSync included in an inter-frequency measurement instruction. However, the UE may decide the assumption of the synchronization based on another information.

For example, information related to whether or not to assume frame timing synchronization (or that the frame timing synchronization may be assumed) during inter-frequency measurement may be explicitly notified from a base station to the UE. When the information is notified, the UE may use a frame timing of a serving cell to derive an index of an SSB to be transmitted from a measurement target cell during inter-frequency measurement.

For example, information related to whether or not to decode a PBCH (or that the PBCH may not be decoded) during inter-frequency measurement may be explicitly notified from the base station to the UE. When the information is notified, the UE may not decode the PBCH in the measurement target cell during inter-frequency measurement.

For example, information related to whether or not to assume SFN synchronization (or that the SFN synchronization may be assumed) during inter-frequency measurement may be explicitly notified from the base station to the UE. When the information is notified, the UE may decide that an SFN of a connected serving cell and an SFN of the measurement target cell are synchronized (aligned) during inter-frequency measurement.

These pieces of information may be notified (configured) from the base station by using higher layer signaling (RRC signaling or an SIB), physical layer signaling (DCI) or a combination of these. In addition, at least one of these pieces of information may be included in an inter-frequency measurement instruction and notified or may be notified at a timing different from that of the inter-frequency measurement instruction.

In addition, when assuming that a certain cell and another cell are synchronized, the UE may assume that frame timings of these cells are synchronized (aligned) or may assume that SFNs are synchronized (aligned). Furthermore, when assuming that the serving cell and the measurement target cell are synchronized, the UE may use the frame timing of the serving cell to derive an index of an SSB to be transmitted from the measurement target cell or may not decode a PBCH in the measurement target cell.

Furthermore, when one or both of a connected serving cell (e.g., a PCell or a PSCell) and the measurement target cell belong to a TDD band, the UE may assume that the serving cell and the measurement target cell are synchronized.

When one or both of the connected serving cell and the measurement target cell belong to the TDD band and useServingCellTimingForSync is enabled, the UE may assume that frame timings of the serving cell and the measurement target cell are synchronized and SFNs of these cells are synchronized. When one or both of the connected serving cell and the measurement target cell belong to the TDD band and useServingCellTimingForSync is not enabled, the UE may assume that the frame timings of the serving cell and the measurement target cell are synchronized and the SFNs of these cells are not synchronized.

When one or both of the connected serving cell and the measurement target cell belong to a Frequency Division Duplex (FDD) band and useServingCellTimingForSync is enabled, the UE may assume that the frame timings of the serving cell and the measurement target cell are synchronized and the SFNs of these cells are not synchronized. When one or both of the connected serving cell and the measurement target cell belong to the FDD band and useServingCellTimingForSync is not enabled, the UE may assume that neither the frame timings of the serving cell and the measurement target cell nor the SFNs are synchronized.

Furthermore, the UE may change an assumption of synchronization related to the serving cell and/or the measurement target cell based on frequency bands of one or both of the connected serving cell (e.g., the PCell or the PSCell) and the measurement target cell.

For example, when both of the connected serving cell (e.g., the PCell or the PSCell) and the measurement target cell belong to the same frequency band (e.g., FR 1) and useServingCellTimingForSync is enabled, the UE may assume inter-carrier synchronization (that is eventually synchronization between the connected serving cell and the measurement target cell). alternatively, when both of the connected serving cell and the measurement target cell belong to the same frequency band, even if useServingCellTimingForSync is enabled, the UE may not assume inter-carrier synchronization, and may assume synchronization between cells on the measurement target frequency.

When both of the connected serving cell (e.g., the PCell or the PSCell) and the measurement target cell belong to different frequency bands (e.g., the serving cell belongs to the FR 1 and the measurement target cell belongs to an FR 2), even if useServingCellTimingForSync is enabled, the UE may not assume inter-carrier synchronization, and may assume synchronization between cells on the measurement target frequency. Alternatively, when both of the connected serving cell and the measurement target cell belong to the different frequency bands, and useServingCellTimingForSync is enabled, the UE may assume inter-carrier synchronization (that is eventually synchronization between the connected serving cell and the measurement target cell).

In addition, the configuration where one frequency range includes a plurality of carriers and one carrier includes a plurality of cells has been described. However, in the present disclosure, a frequency range, a cell, a serving cell, a carrier, a band and a CC may be interchangeably read.

In this regard, in the present disclosure, "inter-frequency measurement" may be read as "handover", and, in this case, a "measurement target" may be read as a "target".

(Radio Communication System)

The configuration of the radio communication system according to one embodiment of the present disclosure will be described below. This radio communication system uses one or a combination of the radio communication method according to each of the above embodiment of the present disclosure to perform communication.

FIG. 2 is a diagram illustrating one example of a schematic configuration of the radio communication system according to the one embodiment. A radio communication system 1 can apply Carrier Aggregation (CA) and/or Dual Connectivity (DC) that aggregate a plurality of base frequency blocks (component carriers) whose one unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), New Radio (NR), Future Radio Access (FRA) and the New Radio Access Technology (New-RAT), or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2. An arrangement and the numbers of respective cells and the user terminals 20 are not limited to those illustrated in FIG. 2.

The user terminal 20 can connect with both of the radio base station 11 and the radio base stations 12. The user terminal 20 is assumed to concurrently use the macro cell C1 and the small cells C2 by using CA or DC. Furthermore, the user terminal 20 can apply CA or DC by using a plurality of cells (CCs).

The user terminal 20 and the radio base station 11 can communicate by using a carrier (also referred to as a legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz or 5 GHz) or may use the same carrier as that used between the user terminal 20 and the radio base station 11. In this regard, a configuration of the frequency band used by each radio base station is not limited to this.

Furthermore, the user terminal 20 can perform communication by using Time Division Duplex (TDD) and/or Frequency Division Duplex (FDD) in each cell. Furthermore, each cell (carrier) may be applied a single numerology or may be applied a plurality of different numerologies.

The numerology may be a communication parameter to be applied to transmission and/or reception of a certain signal and/or channel, and may indicate at least one of, for example, a sub-carrier spacing, a bandwidth, a symbol length, a cyclic prefix length, a subframe length, a TTI length, the number of symbols per TTI, a radio frame configuration, specific filtering processing performed by a transceiver in a frequency-domain, and specific windowing processing performed by the transceiver in a time-domain. For example, a case where sub-carrier spacings of constituent OFDM symbols are different and/or a case where the numbers of OFDM symbols are different on a certain physical channel may be referred to as that numerologies are different.

The radio base station 11 and each radio base station 12 (or the two radio base stations 12) can be configured to be connected by way of wired connection (e.g., optical fibers compliant with a Common Public Radio Interface (CPRI) or an X2 interface) or radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and Single Carrier Frequency Division Multiple Access (SC-FDMA) and/or OFDMA to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into a band including one or contiguous resource blocks per terminal and causes a plurality of terminals to use respectively different bands to reduce an inter-terminal interference. In this regard, uplink and downlink radio access schemes are not limited to a combination of these, and other radio access schemes may be used.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and System Information Blocks (SIBs) are conveyed on the PDSCH. Furthermore, Master Information Blocks (MIBs) are conveyed on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and/or the PUSCH is conveyed on the PDCCH.

In addition, DCI for scheduling DL data reception may be referred to as a DL assignment, and DCI for scheduling UL data transmission may be referred to as a UL grant.

The number of OFDM symbols used for the PDCCH is conveyed on the PCFICH. Transmission acknowledgement information (also referred to as, for example, retransmission control information, HARQ-ACK or ACK/NACK) of a Hybrid Automatic Repeat reQuest (HARQ) for the PUSCH is conveyed on the PHICH. The EPDCCH is subjected to frequency division multiplexing with the PDSCH (downlink shared data channel) and is used to convey DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are conveyed on the PUSCH. Furthermore, downlink radio quality information (CQI: Channel Quality Indicator), transmission acknowledgement information and a Scheduling Request (SR) are conveyed on the PUCCH. A random access preamble for establishing connection with a cell is conveyed on the PRACH.

The radio communication system 1 conveys a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 conveys a Sounding Reference Signal (SRS) and a DeModulation Reference Signal (DMRS) as uplink reference signals. In this regard, the DMRS may be referred to as a user terminal-specific reference signal (UE-specific Reference Signal). Furthermore, a reference signal to be conveyed is not limited to these.

(Radio Base Station)

Figure 3:
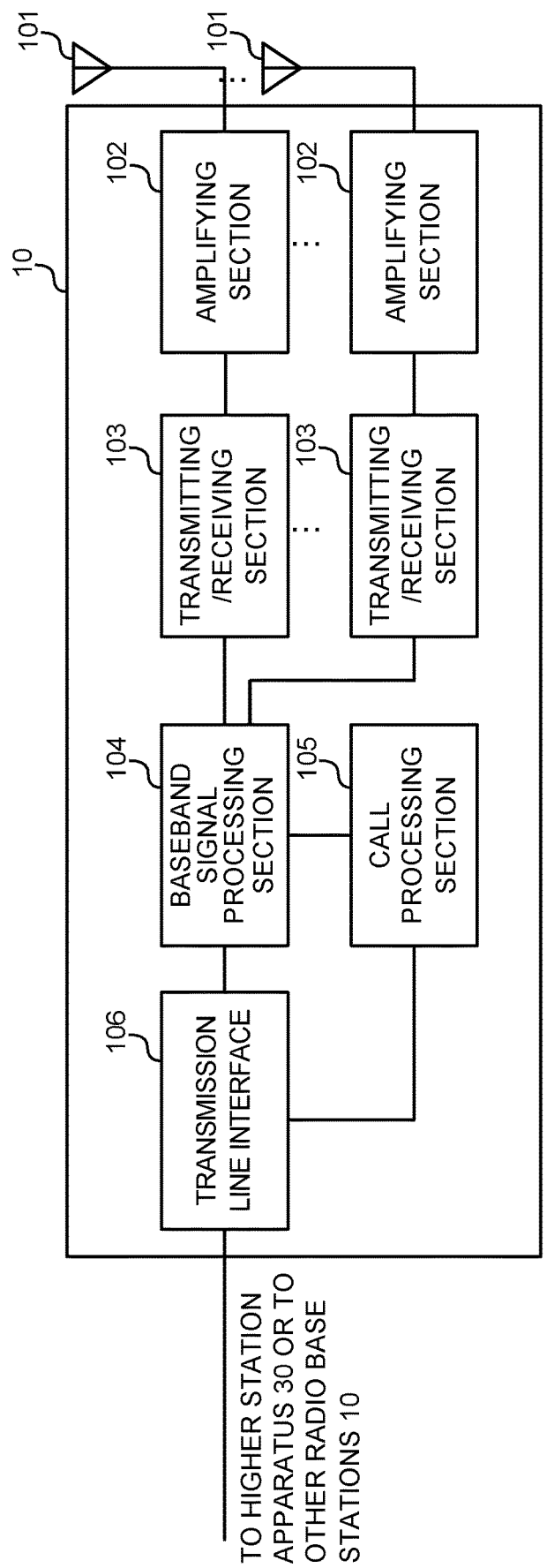
FIG. 3 is a diagram illustrating one example of an overall configuration of a radio base station according to the one embodiment.

FIG. 3 is a diagram illustrating one example of an overall configuration of the radio base station according to the one embodiment. The radio base station 10 includes pluralities of transmitting/receiving antennas 101, amplifying sections 102 and transmitting/receiving sections 103, a baseband signal processing section 104, a call processing section 105 and a transmission line interface 106. In this regard, the radio base station 10 only needs to be configured to include one or more of each of the transmitting/receiving antennas 101, the amplifying sections 102 and the transmitting/receiving sections 103.

User data transmitted from the radio base station 10 to the user terminal 20 on downlink is input from the higher station apparatus 30 to the baseband signal processing section 104 via the transmission line interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmitting/receiving section 103. Furthermore, the baseband signal processing section 104 performs transmission processing such as channel coding and inverse fast Fourier transform on a downlink control signal, too, and transfers the downlink control signal to each transmitting/receiving section 103.

Each transmitting/receiving section 103 converts a baseband signal precoded and output per antenna from the baseband signal processing section 104 into a radio frequency band, and transmits a radio frequency signal. The radio frequency signal subjected to frequency conversion by each transmitting/receiving section 103 is amplified by each amplifying section 102, and is transmitted from each transmitting/receiving antenna 101. The transmitting/receiving sections 103 can be composed of transmitters/receivers, transmitting/receiving circuits or transmitting/receiving apparatuses described based on a common knowledge in a technical field according to the present disclosure. In this regard, the transmitting/receiving sections 103 may be composed as an integrated transmitting/receiving section or may be composed of transmitting sections and receiving sections.

Meanwhile, each amplifying section 102 amplifies a radio frequency signal received by each transmitting/receiving antenna 101 as an uplink signal. Each transmitting/receiving section 103 receives the uplink signal amplified by each amplifying section 102. Each transmitting/receiving section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of an RLC layer and a PDCP layer on user data included in the input uplink signal, and transfers the user data to the higher station apparatus 30 via the transmission line interface 106. The call processing section 105 performs call processing (such as configuration and release) of a communication channel, state management of the radio base station 10, and radio resource management.

The transmission line interface 106 transmits and receives signals to and from the higher station apparatus 30 via a given interface. Furthermore, the transmission line interface 106 may transmit and receive (backhaul signaling) signals to and from the another radio base station 10 via an inter-base station interface (e.g., optical fibers compliant with the Common Public Radio Interface (CPRI) or the X2 interface).

In addition, each transmitting/receiving section 103 may further include an analog beam forming section that performs analog beam forming. The analog beam forming section may be composed of an analog beam forming circuit (e.g., a phase shifter or a phase shift circuit) or an analog beam forming apparatus (e.g., a phase shifter) described based on the common knowledge in the technical field according to the present invention. Furthermore, each transmitting/receiving antenna 101 may be composed of, for example, an array antenna.

Each transmitting/receiving section 103 transmits and/or receives data in a cell included in a carrier to which an SMTC is configured. Each transmitting/receiving section 103 may transmit information related to intra-frequency measurement and/or inter-frequency measurement to the user terminal 20.

Figure 4:
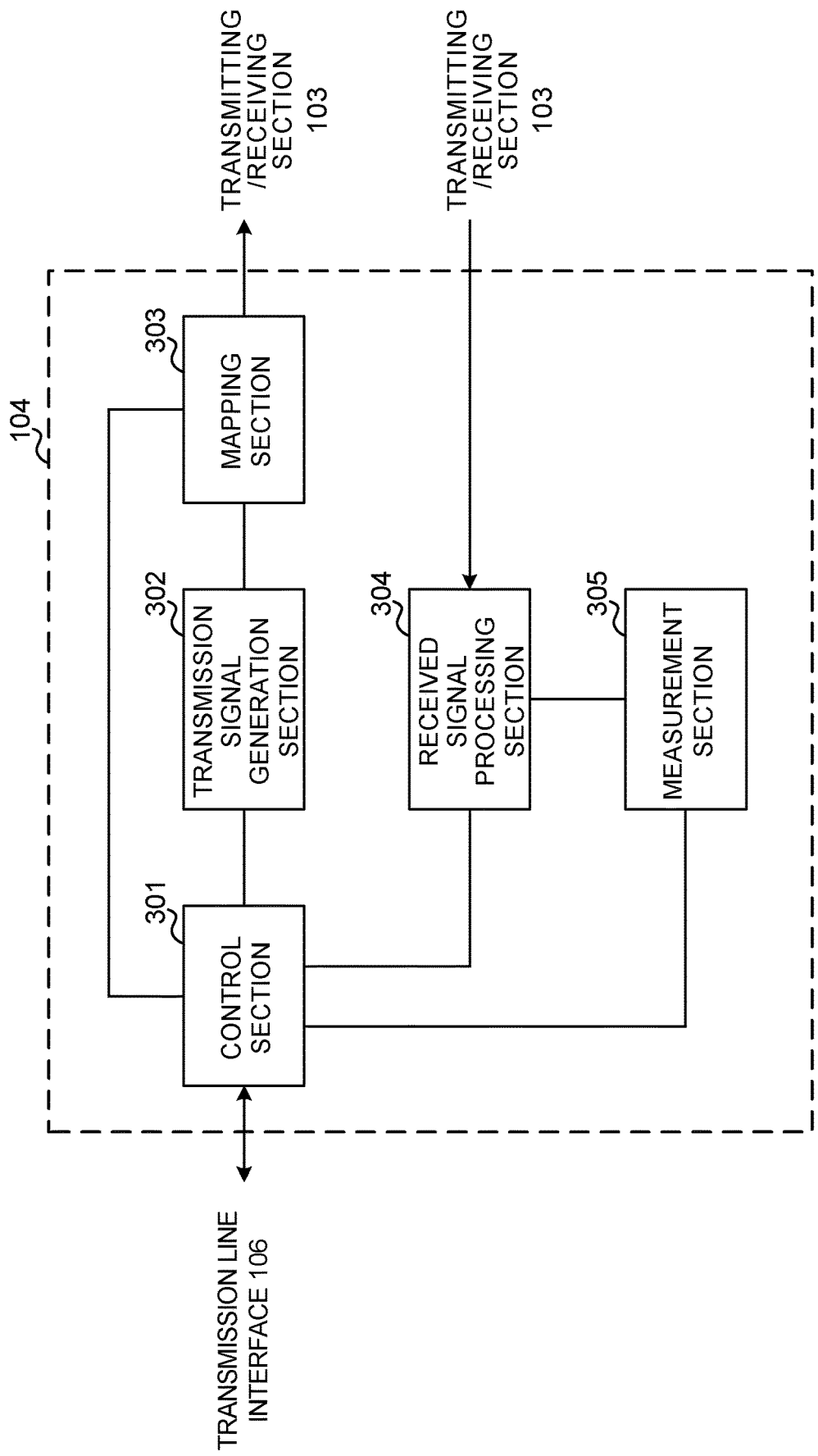
FIG. 4 is a diagram illustrating one example of a function configuration of the radio base station according to the one embodiment.

FIG. 4 is a diagram illustrating one example of a function configuration of the radio base station according to the one embodiment of the present disclosure. In addition, this example mainly illustrates function blocks of characteristic portions according to the present embodiment, and may assume that the radio base station 10 includes other function blocks, too, that are necessary for radio communication.

The baseband signal processing section 104 includes at least a control section (scheduler) 301, a transmission signal generating section 302, a mapping section 303, a received signal processing section 304 and a measurement section 305. In addition, these components only need to be included in the radio base station 10, and part or all of the components may not be included in the baseband signal processing section 104.

The control section (scheduler) 301 controls the entire radio base station 10. The control section 301 can be composed of a controller, a control circuit or a control apparatus described based on the common knowledge in the technical field according to the present disclosure.

The control section 301 controls, for example, signal generation of the transmission signal generating section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal transmitted on the PDSCH), and a downlink control signal (e.g., a signal that is transmitted on the PDCCH and/or the EPDCCH and is, for example, transmission acknowledgement information). Furthermore, the control section 301 controls generation of a downlink control signal and a downlink data signal based on a result obtained by deciding whether or not it is necessary to perform retransmission control on an uplink data signal.

The control section 301 controls scheduling of synchronization signals (e.g., a Primary Synchronization Signal (PSS)/a Secondary Synchronization Signal (SSS)) and downlink reference signals (e.g., a CRS, a CSI-RS and a DMRS).

Furthermore, the control section 301 controls scheduling of an uplink data signal (e.g., a signal transmitted on the PUSCH), an uplink control signal (e.g., a signal that is transmitted on the PUCCH and/or the PUSCH and is, for example, transmission acknowledgement information), a random access preamble (e.g., a signal transmitted on the PRACH) and an uplink reference signal.

The control section 301 may perform control to form a transmission beam and/or a received beam by using digital BF (e.g., precoding) in the baseband signal processing section 104 and/or analog BF (e.g., phase rotation) in each transmitting/receiving section 103. The control section 301 may perform control to form a beam based on downlink channel information and uplink channel information. These pieces of channel information may be obtained from the received signal processing section 304 and/or the measurement section 305.

When a first carrier includes a serving cell of the user terminal 20, the control section 301 may perform control to transmit to the user terminal 20 a measurement instruction for instructing inter-frequency measurement in a second carrier.

The control section 301 may perform control to include, in the above measurement instruction, specific information for controlling processing related to an SSB in a measurement target cell.

The transmission signal generating section 302 generates a downlink signal (such as a downlink control signal, a downlink data signal or a downlink reference signal) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present disclosure.

The transmission signal generating section 302 generates, for example, a DL assignment for notifying downlink data allocation information, and/or a UL grant for notifying uplink data allocation information based on the instruction from the control section 301. The DL assignment and the UL grant are both DCI, and conform to a DCI format. Furthermore, the transmission signal generating section 302 performs encoding processing and modulation processing on a downlink data signal according to a code rate and a modulation scheme determined based on Channel State Information (CSI) from each user terminal 20.

The mapping section 303 maps the downlink signal generated by the transmission signal generating section 302, on a given radio resource based on the instruction from the control section 301, and outputs the downlink signal to each transmitting/receiving section 103. The mapping section 303 can be composed of a mapper, a mapping circuit or a mapping apparatus described based on the common knowledge in the technical field according to the present disclosure.

The received signal processing section 304 performs reception processing (e.g., demapping, demodulation and decoding) on a received signal input from each transmitting/receiving section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present disclosure.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present disclosure.

For example, the measurement section 305 may perform Radio Resource Management (RRM) measurement or Channel State Information (CSI) measurement based on the received signal. The measurement section 305 may measure received power (e.g., Reference Signal Received Power (RSRP)), received quality (e.g., Reference Signal Received Quality (RSRQ), a Signal to Interference plus Noise Ratio (SINR) or a Signal to Noise Ratio (SNR)), a signal strength (e.g., a Received Signal Strength Indicator (RSSI)) or channel information (e.g., CSI). The measurement section 305 may output a measurement result to the control section 301.

(User Terminal)

Figure 5:
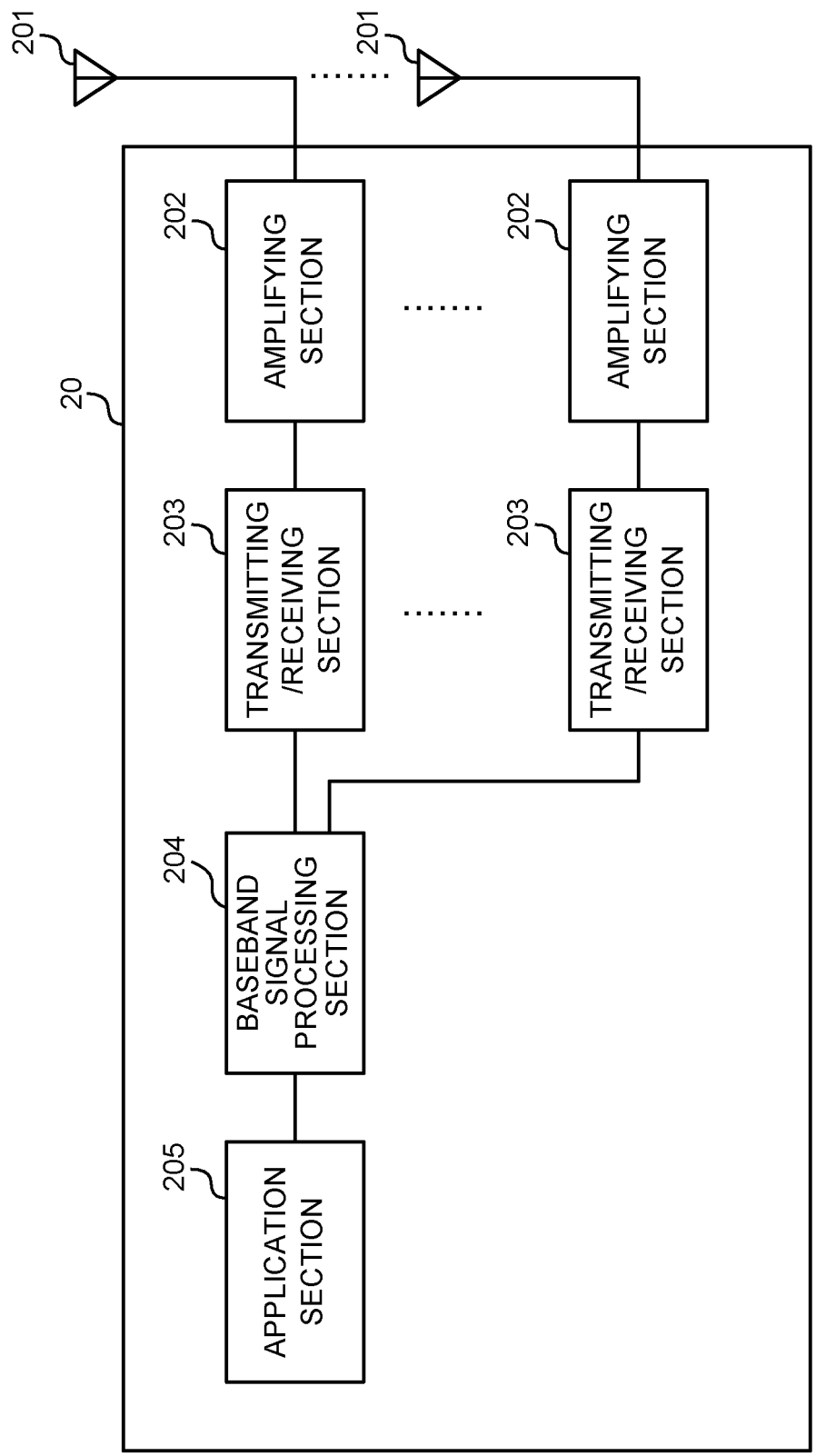
FIG. 5 is a diagram illustrating one example of an overall configuration of a user terminal according to the one embodiment.

FIG. 5 is a diagram illustrating one example of an overall configuration of the user terminal according to the one embodiment. The user terminal 20 includes pluralities of transmitting/receiving antennas 201, amplifying sections 202 and transmitting/receiving sections 203, a baseband signal processing section 204 and an application section 205. In this regard, the user terminal 20 only needs to be configured to include one or more of each of the transmitting/receiving antennas 201, the amplifying sections 202 and the transmitting/receiving sections 203.

Each amplifying section 202 amplifies a radio frequency signal received at each transmitting/receiving antenna 201. Each transmitting/receiving section 203 receives a downlink signal amplified by each amplifying section 202. Each transmitting/receiving section 203 performs frequency conversion on the received signal into a baseband signal, and outputs the baseband signal to the baseband signal processing section 204. The transmitting/receiving sections 203 can be composed of transmitters/receivers, transmitting/receiving circuits or transmitting/receiving apparatuses described based on the common knowledge in the technical field according to the present disclosure. In this regard, the transmitting/receiving sections 203 may be composed as an integrated transmitting/receiving section or may be composed of transmitting sections and receiving sections.

The baseband signal processing section 204 performs FFT processing, error correcting decoding, and reception processing of retransmission control on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information of the downlink data, too, to the application section 205.

On the other hand, the application section 205 inputs uplink user data to the baseband signal processing section 204. The baseband signal processing section 204 performs transmission processing of retransmission control (e.g., HARQ transmission processing), channel coding, precoding, Discrete Fourier Transform (DFT) processing and IFFT processing on the uplink user data, and transfers the uplink user data to each transmitting/receiving section 203.

Each transmitting/receiving section 203 converts the baseband signal output from the baseband signal processing section 204 into a radio frequency band, and transmits a radio frequency signal. The radio frequency signal subjected to the frequency conversion by each transmitting/receiving section 203 is amplified by each amplifying section 202, and is transmitted from each transmitting/receiving antenna 201.

In addition, each transmitting/receiving section 203 may further include an analog beam forming section that performs analog beam forming. The analog beam forming section can be composed of an analog beam forming circuit (e.g., a phase shifter or a phase shift circuit) or an analog beam forming apparatus (e.g., a phase shifter) described based on the common knowledge in the technical field according to the present invention. Furthermore, each transmitting/receiving antenna 201 can be composed of, for example, an array antenna.

Each transmitting/receiving section 203 transmits and/or receives data in a cell included in a carrier to which an SMTC is configured. Each transmitting/receiving section 203 may receive information related to intra-frequency measurement and/or inter-frequency measurement from the radio base station 10. When, for example, the first carrier includes the serving cell, each transmitting/receiving section 203 may receive the measurement instruction for instructing inter-frequency measurement in the second carrier.

Figure 6:
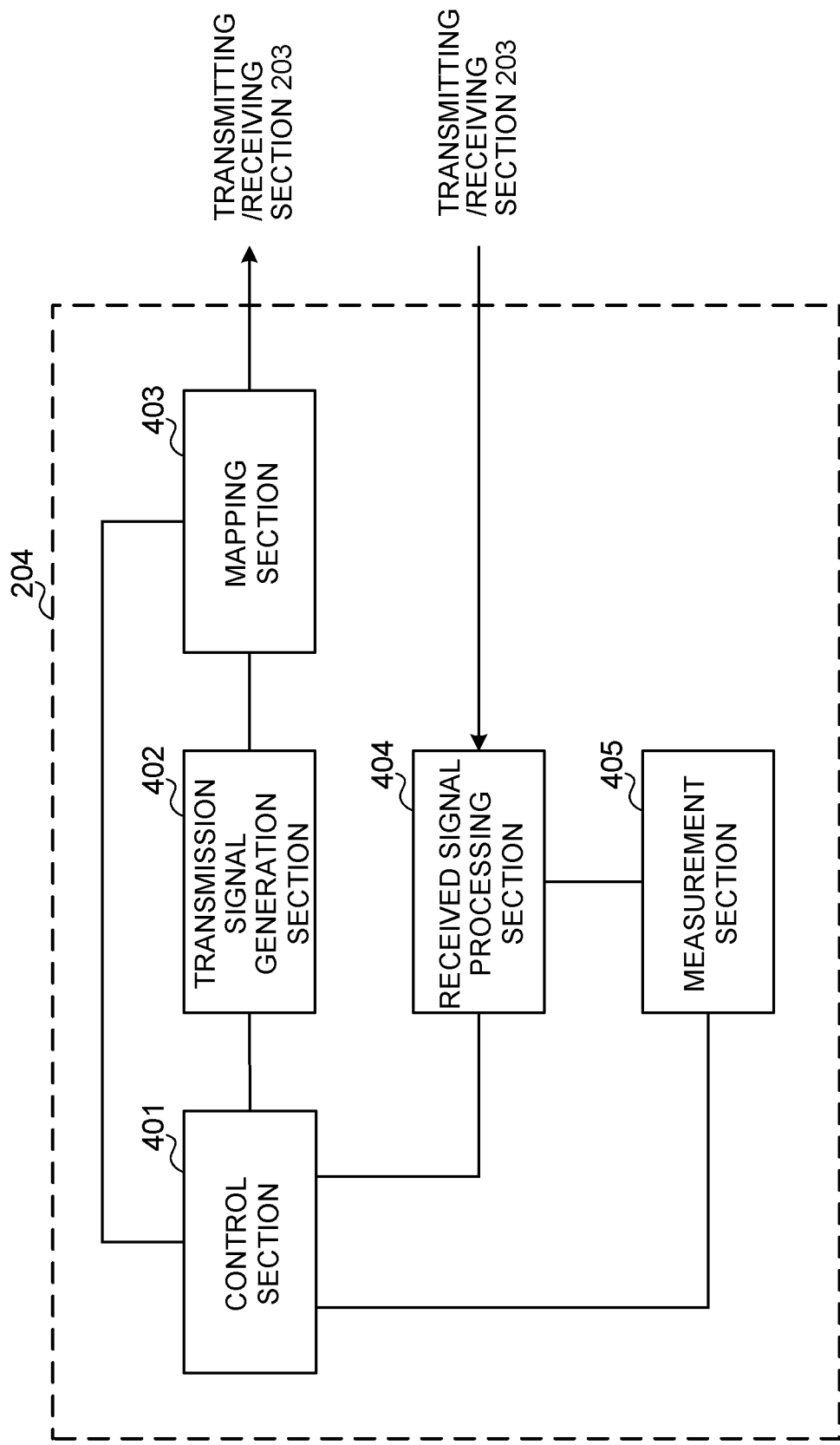
FIG. 6 is a diagram illustrating one example of a function configuration of the user terminal according to the one embodiment.

FIG. 6 is a diagram illustrating one example of a function configuration of the user terminal according to the one embodiment. In addition, this example mainly illustrates function blocks of characteristic portions according to the present embodiment, and may assume that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present disclosure.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 obtains from the received signal processing section 404 a downlink control signal and a downlink data signal transmitted from the radio base station 10. The control section 401 controls generation of an uplink control signal and/or an uplink data signal based on a result obtained by deciding whether or not it is necessary to perform retransmission control on the downlink control signal and/or the downlink data signal.

The control section 401 may perform control to form a transmission beam and/or a received beam by using digital BF (e.g., precoding) in the baseband signal processing section 204 and/or analog BF (e.g., phase rotation) in each transmitting/receiving section 203. The control section 401 may perform control to form a beam based on downlink channel information and uplink channel information. These pieces of channel information may be obtained from the received signal processing section 404 and/or the measurement section 405.

When the first carrier includes the serving cell, the control section 401 may perform control to perform inter-frequency measurement in the second carrier based on the measurement instruction obtained from the received signal processing section 404. In this regard, the above second carrier is a carrier different from the above first carrier. The above measurement instruction may be a MeasObjectNR information element.

When specific information is included in the above measurement instruction, the control section 401 may control processing related to a Synchronization Signal Block (SSB) in a measurement target cell corresponding to the above measurement instruction based on the specific information. In this regard, the above specific information may be information (useServingCellTimingForSync) indicating whether or not an index of an SSB to be transmitted by a neighbour cell can be derived based on a timing of the serving cell, or may be information different from useServingCellTimingForSync.

When, for example, the above specific information is included in the above measurement instruction, the control section 401 may derive the SSB index of the measurement target cell in the above second carrier by using the frame timing of the serving cell in the above first carrier.

When the above specific information is included in the above measurement instruction, the control section 401 may assume that frame timings of a plurality of measurement target cells in the above second carrier are synchronized.

In this regard, that "the above specific information is included in the above measurement instruction" may be read as that "the above specific information is notified". That is, the above specific information may not be included in the above measurement instruction and may be notified by another signaling.

Furthermore, when obtaining from the received signal processing section 404 various pieces of information notified from the radio base station 10, the control section 401 may update a parameter used for control based on the various pieces of information.

The transmission signal generating section 402 generates an uplink signal (such as an uplink control signal, an uplink data signal or an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present disclosure.

The transmission signal generating section 402 generates an uplink control signal related to transmission acknowledgement information and Channel State Information (CSI) based on, for example, the instruction from the control section 401. Furthermore, the transmission signal generating section 402 generates an uplink data signal based on the instruction from the control section 401. When, for example, the downlink control signal notified from the radio base station 10 includes a UL grant, the transmission signal generating section 402 is instructed by the control section 401 to generate an uplink data signal.

The mapping section 403 maps the uplink signal generated by the transmission signal generating section 402, on a radio resource based on the instruction from the control section 401, and outputs the uplink signal to each transmitting/receiving section 203. The mapping section 403 can be composed of a mapper, a mapping circuit or a mapping apparatus described based on the common knowledge in the technical field according to the present disclosure.

The received signal processing section 404 performs reception processing (e.g., demapping, demodulation and decoding) on the received signal input from each transmitting/receiving section 203. In this regard, the received signal is, for example, a downlink signal (such as a downlink control signal, a downlink data signal or a downlink reference signal) transmitted from the radio base station 10. The received signal processing section 404 can be composed of a signal processor, a signal processing circuit or a signal processing apparatus described based on the common knowledge in the technical field according to the present disclosure. Furthermore, the received signal processing section 404 can compose the receiving section according to the present disclosure.

The received signal processing section 404 outputs information decoded by the reception processing to the control section 401. The received signal processing section 404 outputs, for example, broadcast information, system information, RRC signaling and DCI to the control section 401. Furthermore, the received signal processing section 404 outputs the received signal and/or the signal after the reception processing to the measurement section 405.

The measurement section 405 performs measurement related to the received signal. For example, the measurement section 405 may perform intra-frequency measurement and/or inter-frequency measurement on one or both of the first carrier and the second carrier. When the first carrier includes the serving cell, the measurement section 405 may perform inter-frequency measurement in the second carrier based on the measurement instruction obtained from the received signal processing section 404. The measurement section 405 can be composed of a measurement instrument, a measurement circuit or a measurement apparatus described based on the common knowledge in the technical field according to the present disclosure.

For example, the measurement section 405 may perform RRM measurement or CSI measurement based on the received signal. The measurement section 405 may measure received power (e.g., RSRP), received quality (e.g., RSRQ, an SINR or an SNR), a signal strength (e.g., RSSI) or channel information (e.g., CSI). The measurement section 405 may output a measurement result to the control section 401.

(Hardware Configuration)

In addition, the block diagrams used to describe the above embodiment illustrate blocks in function units. These function blocks (components) are realized by an optional combination of hardware and/or software. Furthermore, a method for realizing each function block is not limited in particular. That is, each function block may be realized by using one physically and/or logically coupled apparatus or may be realized by using a plurality of these apparatuses formed by connecting two or more physically and/or logically separate apparatuses directly and/or indirectly (by using, for example, wired connection and/or radio connection).

Figure 7:
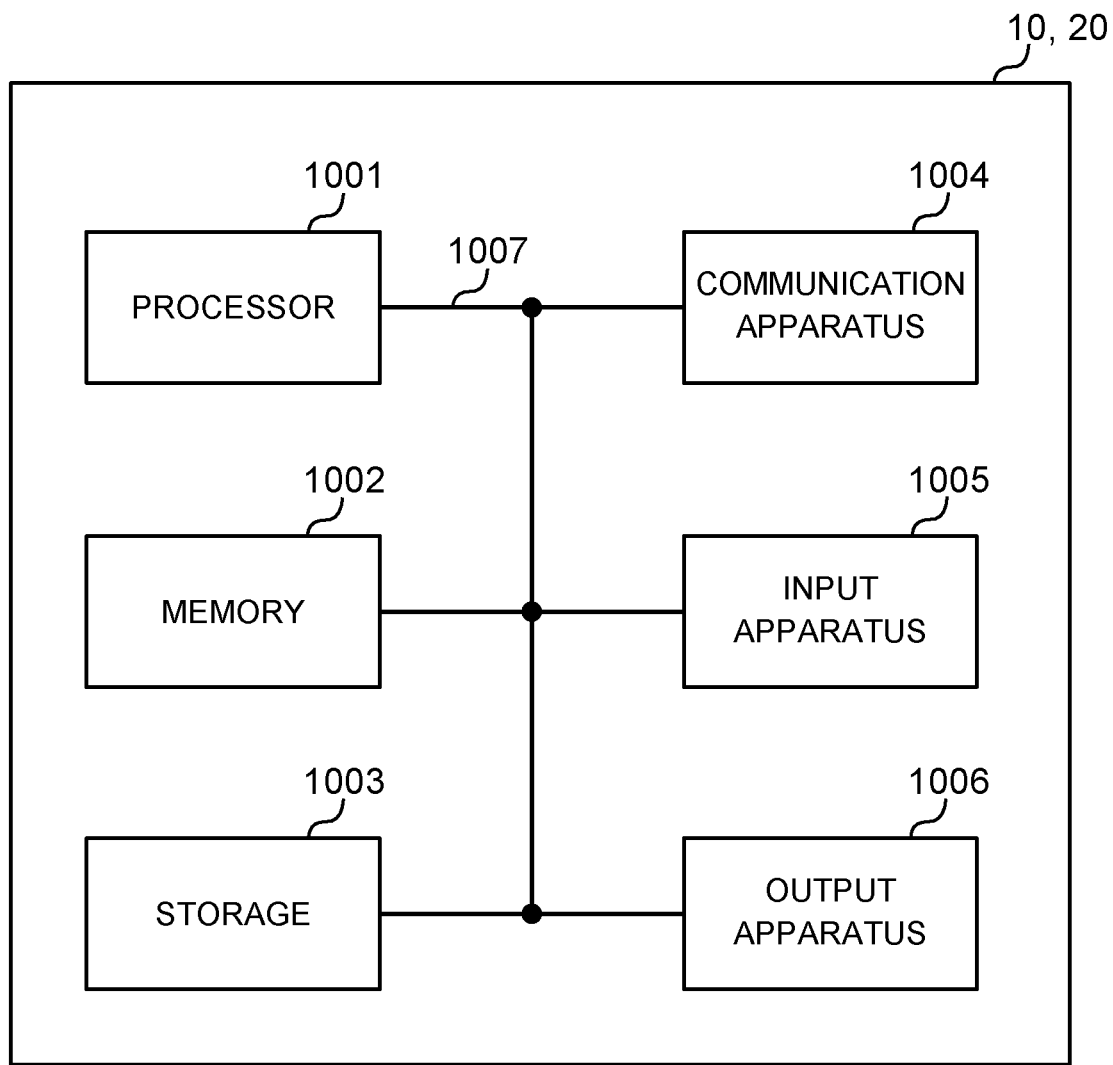
FIG. 7 is a diagram illustrating one example of hardware configurations of the radio base station and the user terminal according to the one embodiment.

For example, the radio base station and the user terminal according to the one embodiment of the present disclosure may function as computers that perform processing of the radio communication method according to the present disclosure. FIG. 7 is a diagram illustrating one example of the hardware configurations of the radio base station and the user terminal according to the one embodiment. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 7 or may be configured without including part of the apparatuses.

For example, FIG. 7 illustrates the only one processor 1001. However, there may be a plurality of processors. Furthermore, processing may be executed by one processor or processing may be executed by one or more processors concurrently, successively or by using another method. In addition, the processor 1001 may be implemented by one or more chips.

Each function of the radio base station 10 and the user terminal 20 is realized by, for example, causing hardware such as the processor 1001 and the memory 1002 to read given software (program), and thereby causing the processor 1001 to perform an operation, and control communication via the communication apparatus 1004 and reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above embodiment are used. For example, the control section 401 of the user terminal 20 may be realized by a control program stored in the memory 1002 and operating on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to carry out the radio communication method according to the one embodiment.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via a wired and/or radio network, and is also referred to as, for example, a network device, a network controller, a network card and a communication module.

The communication apparatus 1004 may be configured to include a high frequency switch, a duplexer, a filter and a frequency synthesizer to realize, for example, Frequency Division Duplex (FDD) and/or Time Division Duplex (TDD). For example, the above transmitting/receiving antennas 101 (201), amplifying sections 102 (202), transmitting/receiving sections 103 (203) and transmission line interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using buses that are different per apparatus.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

(Modified Example)

In addition, each term that has been described in this description and/or each term that is necessary to understand this description may be replaced with terms having identical or similar meanings. For example, a channel and/or a symbol may be signals (signaling). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time-domain. Each of one or a plurality of durations (frames) that composes a radio frame may be referred to as a subframe. Furthermore, the subframe may include one or a plurality of slots in the time-domain. The subframe may be a fixed time duration (e.g., 1 ms) that does not depend on the numerologies.

Furthermore, the slot may include one or a plurality of symbols (Orthogonal Frequency Division Multiplexing (OFDM) symbols or Single Carrier Frequency Division Multiple Access (SC-FDMA) symbols) in the time-domain. Furthermore, the slot may be a time unit based on the numerologies. Furthermore, the slot may include a plurality of mini slots. Each mini slot may include one or a plurality of symbols in the time-domain. Furthermore, the mini slot may be referred to as a subslot.

The radio frame, the subframe, the slot, the mini slot and the symbol each indicate a time unit for conveying signals. The other corresponding names may be used for the radio frame, the subframe, the slot, the mini slot and the symbol. For example, 1 subframe may be referred to as a Transmission Time Interval (TTI), a plurality of contiguous subframes may be referred to as TTIs, or 1 slot or 1 mini slot may be referred to as a TTI. That is, the subframe and/or the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used by each user terminal) in TTI units to each user terminal. In this regard, a definition of the TTI is not limited to this.

The TTI may be a transmission time unit of a channel-coded data packet (transport block), code block and/or codeword, or may be a processing unit of scheduling or link adaptation. In addition, when the TTI is given, a time interval (e.g., the number of symbols) in which a transport block, a code block and/or a codeword are actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

Resource Blocks (RBs) are resource allocation units of the time-domain and the frequency-domain, and may include one or a plurality of contiguous subcarriers in the frequency-domain. Furthermore, the RB may include one or a plurality of symbols in the time-domain or may have the length of 1 slot, 1 mini slot, 1 subframe or 1 TTI. 1 TTI or 1 subframe may each include one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

In this regard, structures of the above radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by using absolute values, may be expressed by using relative values with respect to given values or may be expressed by using other corresponding information. For example, a radio resource may be instructed by a given index.

Names used for parameters in this description are in no respect restrictive ones. For example, various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive ones.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The information and signals to be input and output can be overwritten, updated or additionally written. The output information and signals may be deleted. The input information and signals may be transmitted to other apparatuses.

Notification of information is not limited to the aspect/embodiment described in this description and may be performed by using other methods. For example, the information may be notified by physical layer signaling (e.g., Downlink Control Information (DCI) and Uplink Control Information (UCI)), higher layer signaling (e.g., Radio Resource Control (RRC) signaling, broadcast information (Master Information Blocks (MIBs) and System Information Blocks (SIBs)), and Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") may be made not only explicitly but also implicitly (by, for example, not notifying this given information or by notifying another information).

Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSL)) and/or radio techniques (e.g., infrared rays and microwaves), these wired techniques and/or radio technique are included in a definition of the transmission media.

The terms "system" and "network" used in this description are compatibly used.

In this description, the terms "Base Station (BS)", "radio base station", "eNB", "gNB", "cell", "sector", "cell group", "carrier" and "component carrier" can be compatibly used. The base station is also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used.

The mobile station is also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present disclosure may be applied to a configuration where communication between the radio base station and the user terminal is replaced with communication between a plurality of user terminals (D2D: Device-to-Device). In this case, the user terminal 20 may be configured to include the functions of the above radio base station 10. Furthermore, words such as "uplink" and "downlink" may be read as a "side". For example, the uplink channel may be read as a side channel.

Similarly, the user terminal in this description may be read as the radio base station. In this case, the radio base station 10 may be configured to include the functions of the above user terminal 20.

In this description, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MME) or Serving-Gateways (S-GW) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between two or more elements, and can include that one or more intermediate elements exist between the two elements "connected" or "coupled" with each other. The elements may be coupled or connected physically, logically or by way of a combination of the physical and logical connections. For example, "connection" may be read as "access".

It can be understood that, when connected in this description, the two elements are "connected" or "coupled" with each other by using one or more electric wires, cables and/or printed electrical connection, and by using electromagnetic energy having wavelengths in radio frequency domains, microwave domains and/or (both of visible and invisible) light domains in some non-restrictive and incomprehensive examples.

A sentence that "A and B are different" in this description may mean that "A and B are different from each other". Words such as "separate" and "coupled" may be also interpreted in a similar manner.

When the words "including" and "comprising" and modifications of these words are used in this description or the claims, these words intend to be comprehensive similar to the word "having". Furthermore, the word "or" used in this description or the claims intends not to be an exclusive OR.

The invention according to the present disclosure has been described in detail above. However, it is obvious for a person skilled in the art that the invention according to the present disclosure is not limited to the embodiment described in this description. The invention according to the present disclosure can be carried out as modified and changed aspects without departing from the gist and the scope of the invention defined based on the recitation of the claims. Accordingly, the disclosure of this description intends for exemplary explanation, and does not bring any restrictive meaning to the invention according to the present disclosure.

The invention claimed is:

1. A terminal comprising:
   a receiver that receives a measurement instruction that indicates an inter-frequency measurement in a second carrier that is different from a first carrier of a serving cell; and
   a processor that assumes that frame boundaries of a plurality of cells on the second carrier are aligned, when information indicating that an index of a synchronization signal block (SSB) transmitted by a neighboring cell can be derived based on a timing of the serving cell or a cell of a target frequency is included in the measurement instruction.

2. The terminal according to claim 1, wherein when the information is included in the measurement instruction, the processor derives the index of the SSB of each cell of the second carrier using a timing of one cell on the second carrier.

3. A radio communication method of a terminal comprising:
   receiving a measurement instruction that indicates an inter-frequency measurement in a second carrier that is different from a first carrier of a serving cell; and
   assuming that frame boundaries of a plurality of cells on the second carrier are aligned when information indicating that an index of a synchronization signal block (SSB) transmitted by a neighboring cell can be derived based on a timing of the serving cell or a cell of a target frequency is included in the measurement instruction.

4. A base station comprising:
   a processor that controls to include information indicating that an index of a synchronization signal block (SSB) transmitted by a neighboring cell can be derived based on a timing of a serving cell or a cell of a target frequency in a measurement instruction that indicates an inter-frequency measurement in a second carrier that is different from a first carrier of the serving cell, so as for a terminal to assume that frame boundaries of a plurality of cells on the second carrier are aligned; and
   a transmitter that transmits the measurement instruction to the terminal.

* * * * *